(12) United States Patent
Lawrence

(10) Patent No.: US 10,146,330 B2
(45) Date of Patent: Dec. 4, 2018

(54) SYSTEMS AND METHODS FOR CHARACTER AND COMMAND INPUT

(71) Applicant: Matthew Swan Lawrence, Hamden, CT (US)

(72) Inventor: Matthew Swan Lawrence, Hamden, CT (US)

(*) Notice: Subject to any disclaimer, the term of this patent is extended or adjusted under 35 U.S.C. 154(b) by 65 days.

(21) Appl. No.: 14/741,404

(22) Filed: Jun. 16, 2015

(65) Prior Publication Data

US 2015/0370397 A1 Dec. 24, 2015

Related U.S. Application Data

(60) Provisional application No. 62/014,091, filed on Jun. 18, 2014.

(51) Int. Cl.
*G06F 3/038* (2013.01)
*G06F 3/023* (2006.01)
*G06F 3/0346* (2013.01)

(52) U.S. Cl.
CPC .......... *G06F 3/0346* (2013.01); *G06F 3/0235* (2013.01)

(58) Field of Classification Search
None
See application file for complete search history.

(56) References Cited

U.S. PATENT DOCUMENTS

| | | | |
|---|---|---|---|
| 2,040,248 A | 5/1936 | Dvorak | |
| 4,926,737 A * | 5/1990 | Minamitaka | G10H 1/0025 84/611 |
| 5,267,181 A * | 11/1993 | George | G06F 3/023 708/142 |
| 5,410,333 A | 4/1995 | Conway | |
| 5,432,510 A | 7/1995 | Matthews | |
| 6,102,594 A * | 8/2000 | Strøm | G06F 3/0234 341/21 |
| 6,429,854 B1 | 8/2002 | McKown | |
| 6,552,717 B2 * | 4/2003 | Mailman | G06F 3/018 200/5 R |
| 6,570,557 B1 * | 5/2003 | Westerman | G06F 3/04883 341/22 |
| 6,630,924 B1 | 10/2003 | Peck | |
| 6,670,894 B2 | 12/2003 | Mehring | |
| 7,170,430 B2 | 1/2007 | Goodgoll | |
| 7,218,313 B2 | 3/2007 | Marcus et al. | |
| 7,280,097 B2 * | 10/2007 | Chen | G06F 3/0219 345/156 |
| 7,594,050 B2 * | 9/2009 | Tysowski | G06F 3/0237 710/15 |
| 7,649,522 B2 | 1/2010 | Chen et al. | |
| 7,652,660 B2 | 1/2010 | Chen et al. | |
| 7,667,692 B2 | 2/2010 | Marcus et al. | |
| 7,669,770 B2 | 3/2010 | Wheeler et al. | |
| 7,721,968 B2 | 5/2010 | Wigdor | |
| 8,125,440 B2 * | 2/2012 | Guyot-Sionnest | G06F 3/014 345/156 |

(Continued)

*Primary Examiner* — William Lu
(74) *Attorney, Agent, or Firm* — Pierson IP, PLLC

(57) ABSTRACT

Embodiments disclosed herein describe systems and methods for a user interface allowing a user to input characters, numbers, commands, symbols, etc. with a single hand. Embodiments of the user interface may be a hardware device configured to conform to a user's grip, wherein the device is configured to determine pressure caused by flexions of each of the digits on the user's hand.

6 Claims, 11 Drawing Sheets

(56) References Cited

U.S. PATENT DOCUMENTS

| | | |
|---|---|---|
| 2002/0118176 A1 | 8/2002 | Ribak |
| 2007/0210983 A1 | 9/2007 | Dove et al. |
| 2008/0136679 A1* | 6/2008 | Newman ................ G06F 3/017 341/20 |
| 2009/0051659 A1* | 2/2009 | Mickelborough .... G06F 3/0235 345/173 |
| 2009/0322673 A1* | 12/2009 | Cherradi El Fadili ...................... G06F 3/017 345/157 |
| 2010/0097247 A1 | 4/2010 | Martin |
| 2010/0156818 A1* | 6/2010 | Burrough ................ G06F 3/016 345/173 |
| 2010/0248822 A1* | 9/2010 | Migos ..................... A63F 13/06 463/29 |
| 2013/0135208 A1* | 5/2013 | Volkov .................. G06F 1/1626 345/168 |
| 2014/0359540 A1* | 12/2014 | Kelsey .................... G06F 3/017 715/863 |
| 2015/0057111 A1* | 2/2015 | Tremblay-Munger ...................... A63B 69/0026 473/446 |
| 2015/0084884 A1* | 3/2015 | Cherradi El Fadili ...................... G06F 3/0488 345/173 |

* cited by examiner

600 

Motion defined action commands

| Motion | Direction | Command |
|---|---|---|
| Displacement | Up | Page down |
| Displacement | Down | Page up |
| Displacement | Left | Page right |
| Displacement | Right | Page left |
| Displacement | Forward | Click |
| Displacement | Backward | Double click |
| Pitch | Forward | Curser down |
| Pitch | Backward | Curser up |
| Roll | Right (clockwise) | Curser right |
| Roll | Left (counterclockwise) | Curser left |
| Yaw | Right (clockwise) | Open folder |
| Yaw | Left (counterclockwise) | Close folder |

FIGURE 6

SYSTEMS AND METHODS FOR CHARACTER AND COMMAND INPUT

CROSS-REFERENCE TO RELATED APPLICATIONS

This application claims a benefit of priority under 35 U.S.C. § 119 to Provisional Application No. 62/014,091 filed on Jun. 18, 2014, which is fully incorporated herein by reference in its entirety.

BACKGROUND INFORMATION

Field of the Disclosure

Examples of the present disclosure are related to systems and methods for inputting characters and/or commands via an interface device. More particularly, embodiments disclose an interface device with pressure sensors corresponding to the digits on a user's hand, wherein different flexions of the user's digits are mapped to different characters and/or commands.

Background

Conventional computing devices, such as computers, smart phones, tablets, etc. utilize different types of user interfaces. A user interface allows a user to input commands. Responsive to the user interface receiving the commands from the user, the computing device may perform the corresponding actions.

Conventional user interfaces include: keyboards, keyers, mice, touchscreens, gaming controllers, etc. These conventional user interfaces utilize an array of binary buttons that require two hands to operate. However, conventional user interfaces do not take into account that different users may interact with buttons differently, perform actions to input commands at varying speeds, and/or hold the user interface in differing manners, and the associated influence of each of these considerations and underlying kinematics of the hand on input device ergonomics.

Accordingly, needs exist for more effective and efficient systems and methods for interface devices that detect the flexions associated with each digit on a user's hand while the user is performing actions to input characters and/or commands.

SUMMARY

Embodiments disclosed herein describe systems and methods for an interface device allowing a user to input characters, data, numbers, symbols, commands, including spaces, returns, shifts, curser movements, etc. (referred to herein after collectively and individually as "characters") with a single hand. Embodiments of the interface device may be a hardware device configured to conform to a user's grip, wherein the interface device is configured to determine independent pressure caused by flexions of each of the digits of the user's hand. Responsive to determining an amount of pressure caused by different digit flexions, a computer processor may receive data corresponding to the pressure caused by the flexions and determine the corresponding character.

Embodiments may include an interface device comprising pressure sensors, a coincidence detector, character mapping, and a user's profile.

In embodiments, the pressure sensors may be positioned on the user interface device, wherein different sensors are configured to align with the digits on a user's hand. In embodiments, a plurality of pressure sensors may be aligned with the thumb. The pressure sensors may be configured to determine pressure data, wherein the pressure data is associated with an amount of pressure applied by flexions of the user's digits. In embodiments, pressure data may include measurements received from different pressure sensors that simultaneously measure the pressures applied by flexions of different digits.

In embodiments, digit flexions may be detected by motion of a user's digits or stretching of the dorsal aspect of digits. In these embodiments, the sensors may measure motion or stretch detection, and system interpretation of that data may be utilized to determine corresponding character inputs. For the sake of brevity, the term "pressure" as used herein may refer to individually or collectively as pressure applied by the flexions of a user's digits and the motion or stretch aspect of the user's digits.

In embodiments, the coincidence detector may be configured to determine if the user desired to apply pressure to two or more different pressure sensors coincidently, simultaneously, at the same time, etc. to input a corresponding character. The determination may be based on the timing of pressure detection, applied force to each of the pressure sensors, pressure thresholds corresponding to each digit, and/or a speed at which successive digit flexions are made.

In embodiments the coincidence detector may also be configured to determine if a user's digit flexions are intended to define a single character or successive characters. The determination may be based on the timing of pressure detection, applied force to each of the pressure sensors, adjustable interval thresholds, and/or a speed at which successive digit flexions are made, where interval thresholds are both time limits within which digit flexions are considered to be single chord, and time limits beyond which successive digit flexions are considered to be a successive chord, or chords.

In embodiments, if a user is performing actions to input successive characters at a first rate over a period of time, and it is determined that the user has performed actions to input successive characters at a second rate over the period of time, then coincidence detector may determine that the actions to input a character were inadvertently performed.

In embodiments, the character mapping may be a relationship of characters with pressure data received from pressure sensors. The character mapping may associate different amounts of pressure being applied to different pressure sensors with different characters. Responsive to the digits on the user's hand applying pressure to the aligned pressure sensor(s), the character mapping may determine a corresponding character associated with the pressure being applied to each of the pressure sensors. The mapping of pressures to characters may align the most commonly used characters to the most ergonomic synchronous digit flexions or flexion sequences.

In embodiments, the user's profile may be configured to define the amount of pressure that different digits on the user's hand make to correspond with different characters. Because different digits on the user's hand may cause different amounts of pressure on the pressure sensors when the user is holding the user interface device, the amount of pressure within the user's profile for each digit may be associated with a corresponding pressure threshold. The pressure threshold corresponding to each digit may be utilized to determine if the user intentionally performed a digit flexion to make a character. Furthermore, different digits may have different pressure thresholds, and different user's may have different pressure threshold for each of the user's digits.

In embodiments, the user interface may be a single handed device configured to the left or right hand of a user for the input of alphanumeric characters, symbols, commands or other data. The user interface may include a means of detecting the flexion force of each finger, a means of detecting the flexion force of the thumb in a plurality of abducted and adducted positions, a circuit, power source, and transmitter allowing the transmission of detected digit flexion forces and their interpretation to coupled computing, communication, entertainment or display devices by electromagnetic signal, and a means of translating the single or coupled flexion of fingers and thumb, representing chord sequences, to alphanumeric characters, symbols and commands such that chords correspond inversely by difficulty to the most frequent characters, symbols and commands employed by the user, or a representative user, or as defined by the user, and user preference, or is otherwise defined to provide a unique correspondence of digit chords to characters.

In embodiments, in addition to or in place of the detection of flexion forces the device detects the stretch of the dorsal aspect of each digit associated with digit flexions and translates the single or simultaneous flexion stretch signal of fingers and thumb to alphanumeric characters, symbols and commands in the manner described.

In embodiments, in addition to or in place of the detection of flexion forces or digit stretch the device detects the flexion movement of each digit and translates the single or simultaneous flexion movement of fingers and thumb to alphanumeric characters, symbols and commands in the manner described.

In embodiments, the device may include an accelerometer that detects orientation and movement of the device in three-dimensional space and translates and transmits that movement as command functions to coupled computing, communication, entertainment or display devices by electromagnetic signal.

In embodiments, the device may be paired with a second, matching device configured to the opposite hand, wherein both device may be used at the same time for augmented data input.

Embodiments may include methods for translation of single and coupled digit flexion forces, representing chord sequences, to standard character encoding. The method may include translating digit chords to the characters employed in a language such that chord difficulty, as defined by the hand kinematics of the user, or a representative population of users, is inversely proportional to character frequency as defined by the common incidence of usage of the character in the respective language, or by the respective user, or is otherwise defined to provide a unique correspondence of digit chords to characters. The method may further include determining the strength of individual digit flexion forces that allows adjustment of the threshold force defining a positive signal to accommodate differences in digit strength in the user's hand and differences in overall digit strength between users. The method may also include determining a time interval between two or more digit flexion forces such that applied forces are defined as coincident, and corresponding to a chord, if falling within a specified adjustable interval, with adjustment guided by the speed at which successive digit flexion sequences are made, such that the time interval defined as coincident is correlated to the speed of chord sequences.

In embodiments, the determination of threshold forces that define positive digit flexion signals and threshold time intervals that define coincident digit flexions, are adjusted by the device software through machine learning.

In embodiments, the character assignment is defined by hand kinematic data generated by the device or another device that ranks the degree of difficulty of digit chord sequences by the criteria of force, speed or user reported difficulty of execution.

In embodiments, the character assignment is customized by the user without ergonomic correlation of character frequency to optimal hand kinematics.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 6 depicts a character map associated with the motion of interface device, according to an embodiment.

Figure 1:
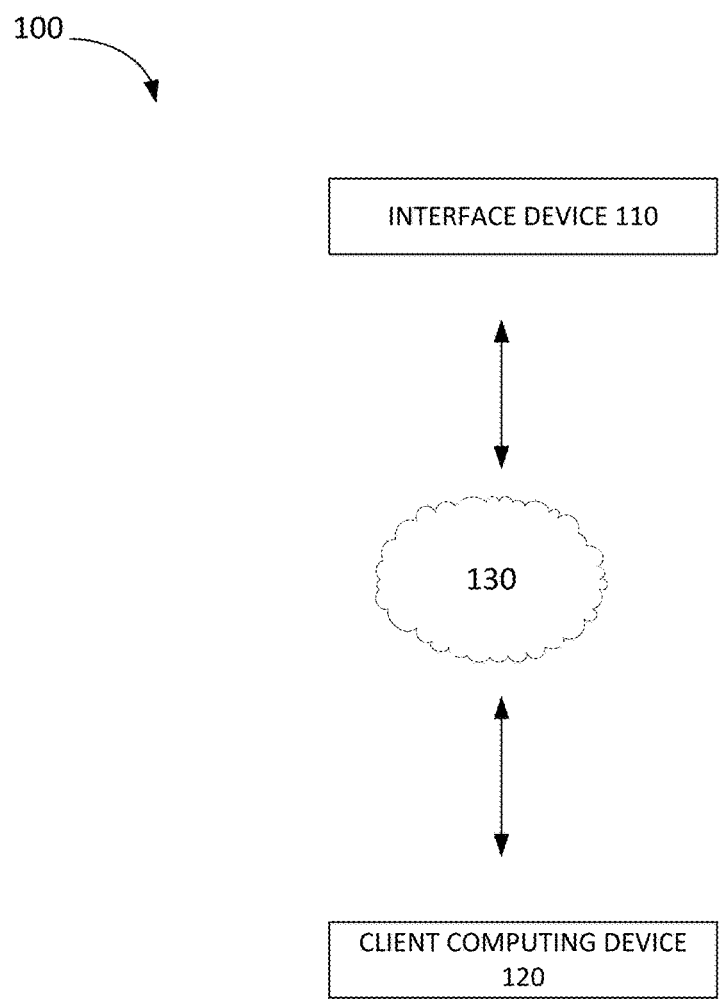
FIG. 1 depicts a topology of an interface system, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Embodiments disclosed herein describe systems and methods for an interface device allowing a user to input characters, numbers, commands, symbols, etc. with a single hand. Embodiments of the user interface may be a hardware device configured to conform to a user's grip, wherein the device is configured to determine pressure data associated with flexions of each of the digits on the user's hand.

FIG. 1 depicts one embodiment of a topology for interface system 100. Interface system 100 may include interface device 110, client computing device 120, and network 130.

Network 130 may be a wired or wireless network such as the Internet, an intranet, a LAN, a WAN, a NFC network, Bluetooth, universal serial bus, infrared, radio frequency, a cellular network, or another type of network. It will be understood that network 130 may be a combination of multiple different kinds of wired or wireless networks.

Interface device 110 may be a hardware device that is ergonomically designed to be held by a user with a single hand. Interface device 110 may include a plurality of pressure sensors corresponding to different digits of the user's single hand. The pressure sensors may be configured to determine pressure caused by flexions of corresponding digits of the user's hand. For example, a first pressure sensor may correspond to the user's index finger, a second pressure sensor may correspond to the user's middle finger, etc. Responsive to the pressure sensors determining an amount of pressure corresponding to the pressure caused by the flexions of the user's digits, interface device 110 may determine a character associated with the pressure caused by the flexions of the user's digit. Therefore, interface device 110 may be utilized instead of, or in combination with, a conventional interface such as a touch screen, physical keyboard, mouse, etc.

Client computing device 120 may be a laptop computer, desktop computer, smart phone, tablet computer, personal data assistant, head-mounted computing device, arm-mounted computing device or any other type of device with a hardware processor that is configured to process instructions and connect to network 130. Client computing device 120 may include a display configured to present the characters determined by interface device 110. Furthermore, functionality of interface device 110, as discussed below, may be completed remotely at client computing device 120.

Figure 2:
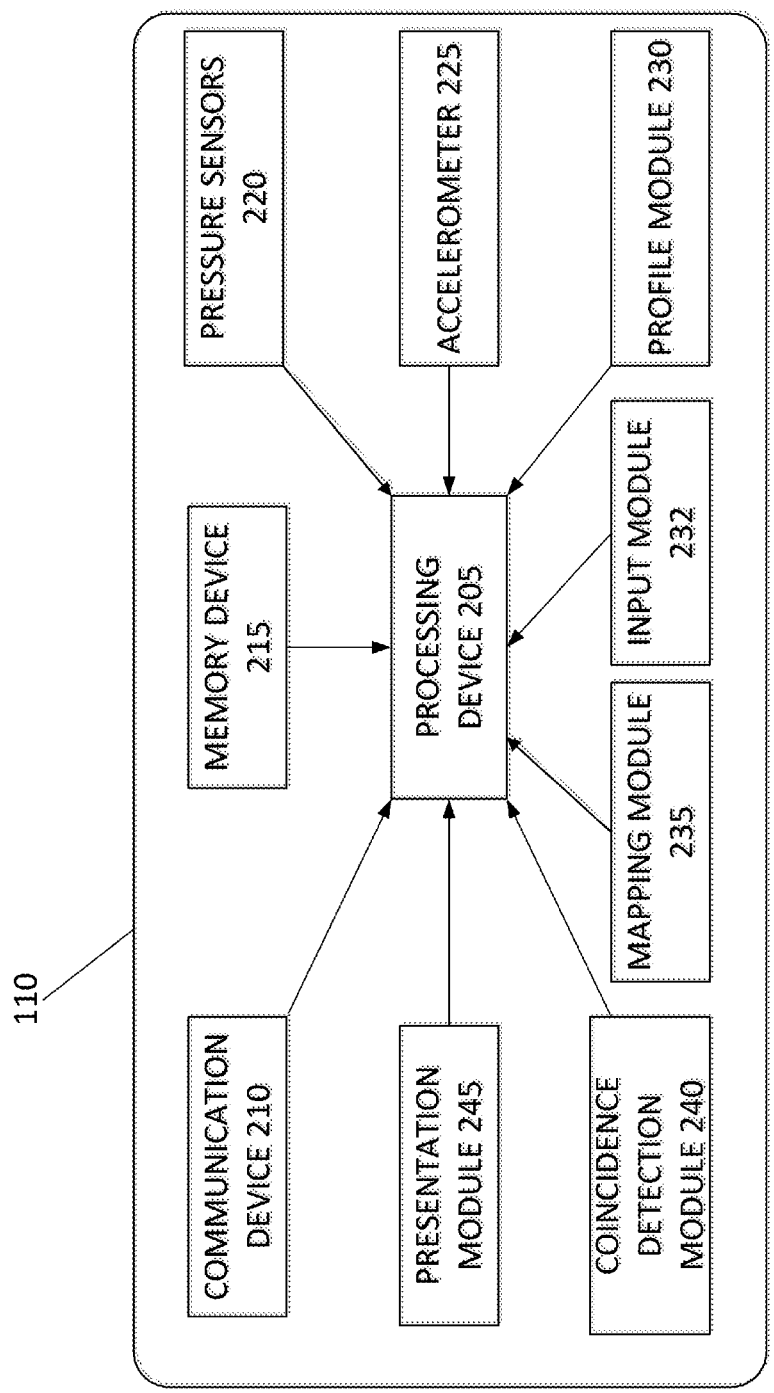
FIG. 2 depicts an interface device, according to an embodiment.

FIG. 2 depicts one embodiment of interface device 110. Interface device 110 may include a processing device 205, a communication device 210, a memory device 215, pressure sensors 220, accelerometer 225, profile module 230, input module 232, mapping module 235, coincidence detection module 240, and presentation module 245.

Processing device 205 may include memory, e.g., read only memory (ROM) and random access memory (RAM), storing processor-executable instructions and one or more processors that execute the processor-executable instructions. In embodiments where processing device 205 includes two or more processors, the processors may operate in a parallel or distributed manner. Processing device 205 may execute an operating system of interface device 110 or software associated with other elements of interface device 110.

Communication device 210 may be a device that allows interface device 110 to communicate with another device (e.g. client computing device 120) over network 130. Communication device 210 may include one or more wireless transceivers for performing wireless communication and/or one or more communication ports for performing wired communication. Communication device 210 may be configured to communicate data over a plurality of different standards and/or protocols.

Memory device 215 may be a device that stores data generated or received by interface device 110. Memory device 215 may include, but is not limited to a hard disc drive, an optical disc drive, and/or a flash memory drive. In embodiments, memory device 215 may be configured to store information received from a client computing device and/or a retailer computing device. The information stored within memory device 215 may be accessed by processing device 205, communication device 210, pressure sensors 220, accelerometer 225, and modules 230, 232, 235, 240, 245. In embodiments, memory device 215 may be configured to store a mapping of characters with pressure data determined by pressure sensors 220, and default pressure data associated with when a user is holding interface device 110 without performing actions to enter a character.

Pressure sensors 220 may be hardware devices configured to determine pressure data, wherein the pressure data is associated with an amount of pressure against the interface device 110 caused by flexion of a user's digits. Pressure sensors 220 may be positioned within or on interface device 110, such that individual pressure sensors 220 may be aligned with different digits of a user. Pressure sensors 220 may be positioned within or on an external surface interface device 110 to measure a pressure applied to a respective pressure sensor 220 responsive to the flexion of a corresponding digit.

In embodiments, a plurality of pressure sensors 220 may be aligned with the distal or middle phalange of the user's thumb, wherein the pressure sensors 220 aligned with the user's thumb may be positioned at points in a sweep of the thumb's rotation from abduction to adduction.

Pressure sensors 220 may be configured to dynamically determine pressure data corresponding to the pressure applied to each pressure sensor 220 independently and simultaneously. Pressure sensors 220 may determine the pressure applied to each pressure sensor 220 at set intervals (e.g., every $\frac{1}{100}^{th}$ of a second, every second, etc.), or to be responsive to the user performing an action to enter a character. Responsive to pressure sensors 220 determining the pressure data for each corresponding digit, pressure sensors 220 may transmit the pressure data to input module 232. In embodiments, the pressure data may include the amount of pressure being applied to each pressure sensor 220, wherein each pressure sensor 220 determines the amount of pressure being applied simultaneously, or within a time threshold defined to be interpreted as simultaneous by the coincidence detection module 240.

Accelerometer 225 may be a hardware device configured to determine movement data of interface device 110. The movement data may include information associated with the displacement and/or acceleration of interface device 110. Accelerometer 225 may determine the directional movement of interface device 110 by measuring rotational forces applied by a user to interface device 110. Accelerometer 225 may determine a direction of displacement and acceleration that interface device 110 moves in a direction, which may be quantified in meters per second square or G-force. Responsive to accelerometer 225 determining the movement data, accelerometer 225 may transmit the movement data to input module 232.

Profile module 230 may be a hardware processing device configured to allow the user of interface device 110 and/or client computing device 120 to generate and create a user profile. The user's profile may include information stored in memory device 215 and/or other storage locations. The user's profile may include user information, mapping information, pressure information, and speed information.

The user information may include information identifying the user (e.g., a username or handle, a number, an identifier, and/or other identifying information), security login information (e.g., a login code or password).

The mapping information may include information that maps pressure data with characters. In embodiments, the mapping information may also include a language associated with the user, wherein different languages may have different mappings of characters with pressure data. In embodiments, the mapping information may also include a number of digits associated with the user, wherein an individual with fewer digits, either missing or otherwise impaired, may have different mappings of characters with pressure data.

The pressure information may include information corresponding to default pressure data associated with pressure sensors 220 when the user is holding interface device 110 and/or performing actions to input characters. Because different users may hold and/or interact with interface device 110 differently, each user may cause different amounts of pressure against pressure sensors 220 when holding interface device 110 and/or performing actions to input different characters. Therefore, the pressure information may include the pressure data determined by each independent pressure sensor 220 when the user is holding interface device 110 and inputting different characters. The pressure data determined by each pressure sensor 220 when the user is interacting with interface device 220 may be associated with pressure thresholds for each pressure sensor 220 for the user. The pressure thresholds may be the pressure data associated with independent pressure sensors 220 when the user is interacting with interface device 110. Alternatively, the pressure thresholds for each pressure sensor may be a set value above or below baseline pressure data, wherein the baseline pressure data may be determined by the user holding interface device 110 without inputting characters. In embodiments, the pressure thresholds may be independently set or determined for each pressure sensor 220.

The speed information may include information corresponding to how quickly a user inputs characters on interface device 110. The speed information may be associated with a number of characters input over a certain time range (e.g. second, minute, etc.). Additionally, the speed information may include information corresponding to how quickly a user inputs characters based on the mapping of characters and pressure data to input the character. Because certain characters may be more or less difficult to input based on the flexions of the user's digits (e.g. a character requiring the user to apply pressure to each pressure sensor 220 may be easier to input than a character requiring the user to apply pressure to each pressure sensor 220 except for the pressure sensor 220 associated with the user's middle finger), any given input character and the succeeding or preceding input character may take more or less time to input. The speed information may include interval thresholds to define both 1) the time intervals within which digit flexions, as detected by the pressure sensors 220, and/or 2) device motions as detected by the accelerometer 225, are determined to be individual characters and commands, and time intervals beyond which digit flexions and/or device motions are determined to be separate. The speed information may include the rate or time required to define a character, and time intervals after the completion of a character before which another detected flexion or coincident flexions are identified as a succeeding character.

Input module 232 may be a hardware processing device configured to determine input data based on the pressure data applied to each pressure sensor 220 and the pressure thresholds associated with each pressure sensor 220. If the pressure data is above the pressure threshold associated with the pressure sensor 220, input module 232 may be configured to determine that the user desired to create enough pressure with the corresponding digit to enter a character. In embodiments, the input data may be an aggregate binary chord associated with each pressure sensor 220. The binary chord may be a chord that is interpreted as a character or not interpreted as a character based on whether each collective segments of the chord exceed a respective pressure threshold. Therefore, each of the segments of the binary chord may indicate if a single, independent pressure sensor 220 receives pressure greater than the corresponding pressure threshold.

More specifically, if a pressure sensor 220 corresponding to a first digit receives an amount of pressure greater than the pressure threshold for the first digit, the segment of the binary chord associated with the first digit may be determined as detected. If the pressure sensor 220 corresponding to the first digit is not receiving an amount of pressure greater than the pressure threshold for the first digit, the segment of the binary chord associated with the first digit may not be determined as detected.

Mapping module 235 may be a hardware processing device configured to parse a character map to determine what character a user desires to input based on the movement data and/or the input data. The character map may associate characters with input data and/or movement data. In embodiments, a character may be mapped to a single set of input data and/or movement data and/or a plurality of sets of input data and/or movement data. In embodiments, the character mapping may be based on the user's most frequently input data and/or movement data, wherein the characters that the user most frequently inputs are assigned to the most ergonomic and/or commonly used input data and/or movement data. Accordingly, the character mapping may align the most ergonomic and/or commonly used input data and/or movement data with the most commonly used characters to form an ergonomic and efficient interface device 110, or interface device 110 configured to the preference of the user.

Coincidence module 240 may be a hardware processing device configured to determine if digit flexions detected by pressure sensors 220 should be identified as a character. Coincidence module 240 may determine if the digit flexions are associated with a character based on mapping module 235 determining that a plurality of pressure sensors 220 detect pressures inputs exceeding their respective pressure thresholds within a specified time threshold defining the interpretation of flexions as coincidence. In embodiments, the time and pressure thresholds may be digit specific, character specific, and/or associated with a user.

Coincidence module 240 may additionally be configured to determine if digit flexions detected by the pressure sensors 220 and accelerometer 225 associated with the pressure data and/or movement data should be a character or a plurality of successive characters determined by mapping module 235. In embodiments, detected digit flexions not determined as a character or a plurality of successive characters by coincidence module 240 may not be transmitted to another element over network 130 and/or stored within memory device 215. Coincidence module 240 may determine if a character should be transmitted based on the speed information associated with the user's profile to accommodate for users with higher or lower proficiencies of entering input data and/or movement data. In embodiments, the speed information may be associated with an adjustable interval threshold limiting, determining, or confining the time within which digit flexions are considered coincident. The interval that flexions of a plurality of digits may be detected as character inputs may have a shorter or longer interval threshold based on the length of time required to form the chord. In embodiments, different chords may have different adjustable interval thresholds defining coincidence, wherein if the length of time to apply a specific combination of flexions defining a chord takes a longer period of time then the adjustable interval threshold may be increased. If the length of time to apply a specific combination of flexions defining a chord typically takes a shorter period of time then the adjustable interval threshold may be decreased. Accordingly, by chord-specific adjustable coincidence thresholds the coincidence module defines time intervals within which characters may be recorded, transmitted and stored.

In embodiments, the speed information may be associated with an adjustable interval threshold determining the time a successive digit flexion is interpreted to be contributing to the mapping of a new chord and associated character. The time interval between successive chords may have a shorter or longer interval threshold based on the length of time required to transition from a first chord to a second chord. In embodiments, if a second chord occurs within a time interval threshold after the first chord, then the character determined by mapping module 235 may not be transmitted and/or stored. In embodiments, different successive chords may have different adjustable interval thresholds, wherein if the length of time to transition from a first chord to a second chord typically takes a longer period of time then the adjustable interval threshold may be increased. If the length of time to transition from the first chord to the second chord typically takes a shorter period of time then the adjustable interval threshold may be decreased. Accordingly, chords that are entered too quickly may not be transmitted and/or stored.

Presentation module 245 may be a hardware processor that may transmit characters determined by mapping module 235 that are determined as a character by coincidence module 240 to other networked elements (e.g. client computing device 120) over network 130. The characters may be transmitted to be displayed in a word processor or in any other useable manner, wherein the determined characters may be viewed or otherwise detected by a user. Presentation module 245 may be configured to dynamically transmit determined characters over network 130, transmit determined characters at set intervals, or transmit determined characters responsive to interface device 110 determining a command input by the user to transmit the determined characters.

Figure 3:
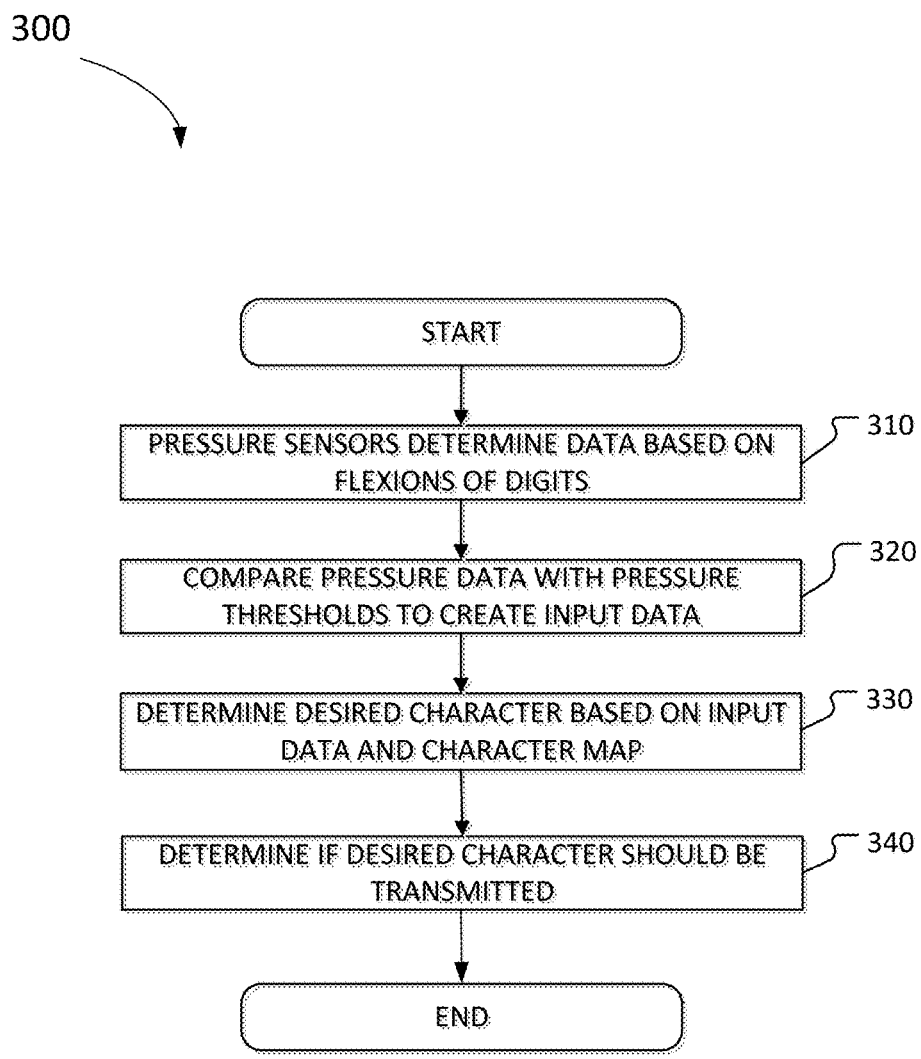
FIG. 3 depicts a method for a user to input characters utilizing a user interface, according to an embodiment.

FIG. 3 illustrates a method 300 for a user to input characters utilizing a user interface. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 500.

At operation 310, pressure sensors may receive pressure from flexions of a user's digits. The pressure sensors may be aligned with different digits of the user's hand, and each pressure sensor may independently determine an amount of received pressure from an aligned digit. The data determined by each of the pressure sensors may create pressure data with segments of data determined by each pressure sensor. Operation 310 may be performed by pressure sensors that are the same as or similar to pressure sensors 220, in accordance with one or more implementations.

At operation 320, the data determined by each of the pressure sensors may be compared to pressure thresholds associated with each pressure sensor, wherein different users and/or digits may have different pressure thresholds. Responsive to the pressure data associated with a first digit being greater than or equal to a pressure threshold corresponding to the first digit and/or user, the pressure data associated with the first digit may be determined as a positive input. Responsive to the pressure data associated with the first digit being less than the pressure threshold corresponding to the first digit and/or user, the pressure data associated with the first digit may be determined as a negative input. The inputs associated with the pressure data and pressure thresholds may be aggregated together to form a chord of input data. The input data may indicate which pressure sensors have positive inputs and negative inputs as the user is performing actions to generate a character. Operation 320 may be performed by an input module that is the same as or similar to input module 232, in accordance with one or more implementations.

At operation 330, the input data, including the positive and negative inputs, may be compared to a character map to determine what character is associated with the input data. Responsive to matching the input data with an entry within the character map, a character corresponding to the entry within the character map may be determined. The corresponding character may be determined by an input chord that matches the positive and negative inputs of the input data. Operation 330 may be performed by a mapping module that is the same as or similar to mapping module 235, in accordance with one or more implementations.

At operation 340, it may be determined if a character associated with the input data and character mapping should be transmitted. The character may be transmitted based on the determination of a flexion or coincident flexions that define a chord, the amount of time between successive chords of input data being generated, speed information associated with the user, and/or adjustable interval thresholds defining within what interval flexions are consider coincident and/or beyond what interval successive flexions are considered successive chords of input data. The adjustable interval thresholds may be based on the amount of time the user takes to generate a single chord of input data or successive chords of input data and the degree of change in digit flexions between the first chord of input data and the second chord of input data. Operation 340 may be performed by a coincidence module that is the same as or similar to coincidence module 240, in accordance with one or more implementations.

Figure 4:
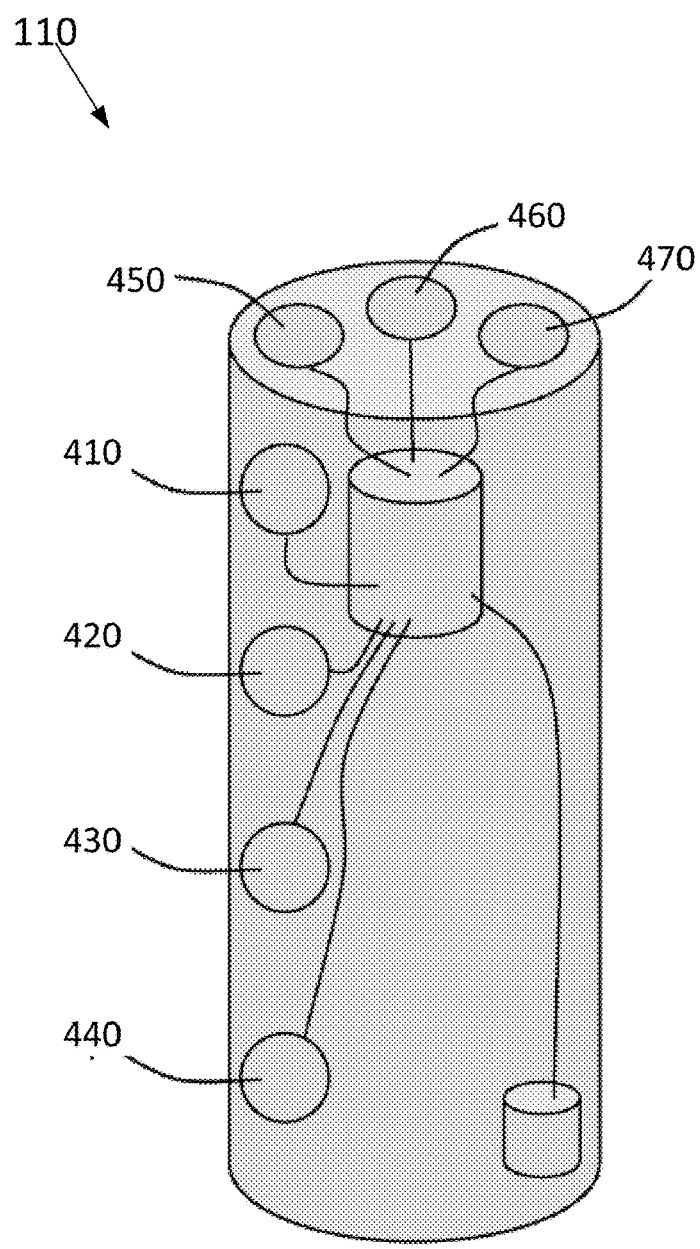
FIG. 4 depicts an input device, according to an embodiment.

FIG. 4 depicts one embodiment of input device 110. As depicted in FIG. 4 a plurality of pressure sensors 410, 420, 430, 440, 450, 460, and 470 may be disposed on the surface of input device 110. Pressure sensors 410, 420, 430, and 440 may be configured to align with a user's index finger, middle finger, ring finger, and pinky finger, respectively. Pressure sensors 450, 460, and 470 may be configured to align with a user's thumb. Because a user may be accustomed to performing flexions associated with different digits at different strengths, each of the pressure sensors 410, 420, 430, 440, 450, 460, and 470 may have different pressure thresholds based on how the user typically interacts with the pressure sensors 410, 420, 430, 440, 450, 460, and 470. Furthermore, because different users may be accustomed to performing flexions associated with different digits at different strengths, different users may have different pressure thresholds associated with each pressure sensors 410, 420, 430, 440, 450, 460, and 470.

Figure 5:
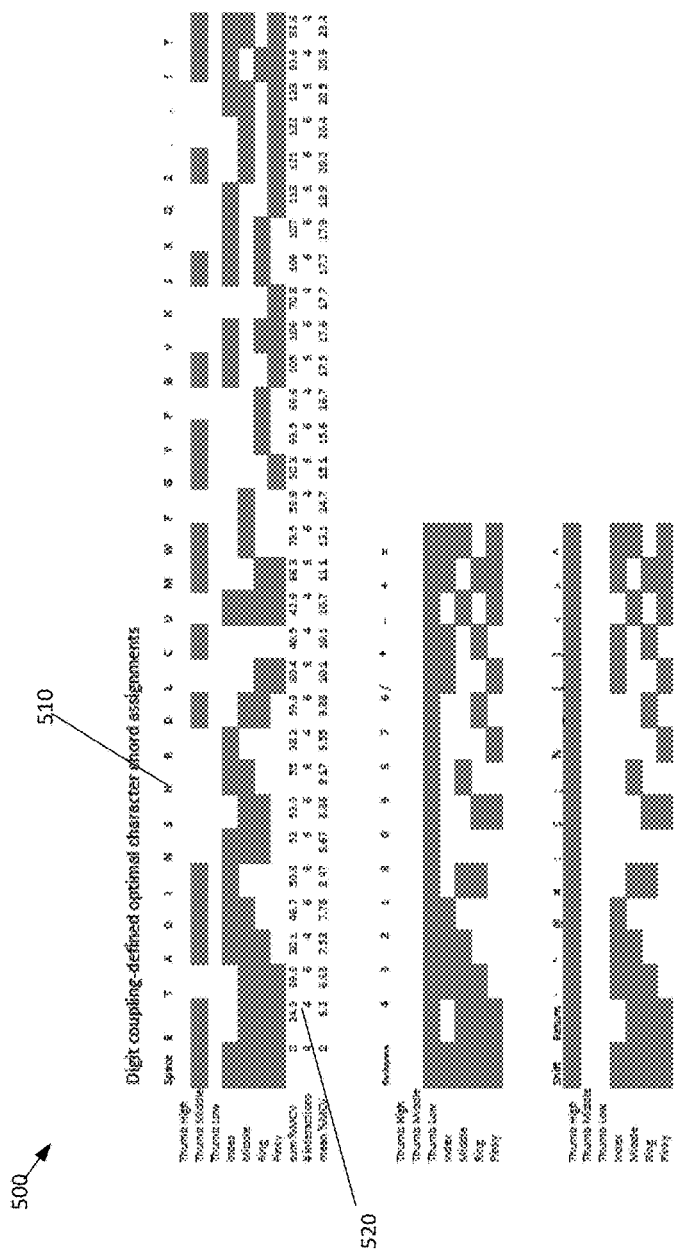
FIG. 5 depicts a character map associating characters to input data, according to an embodiment.

FIG. 5 depicts one embodiment of a character map 500 associating characters to input data. In embodiments, character map 500 may be spreadsheet including a number of rows corresponding to the number of pressure sensors and relating to data generated by the pressure sensors 220 and a number of columns corresponding with mapped characters 510 and relating to the user's characters defined in the profile module 230. Individual cells within the matrix may be marked as indicating that the corresponding pressure sensor is detecting or not detecting a user digit flexion such that specific chords are defined in each column and the plurality of columns defines a map relating digit chords to characters 510. Associated with each digit chord in character map 500 may be a chord rank 520. The chord rank 520 may be figure or other qualification ranking the chord by the difficulty or speed with which a digit chord is performed, user preference, or other criteria. The chord rank 520 may define the mapping of digit chords to character inputs to correlate lower difficulty and/or higher speed chords with more commonly used characters. Each character map 500 may be a listing of mapped characters 510 that associates chord rank 520 with the frequency of character use such that mapping of input data may be adjusted to the pressure thresholds and/or interval thresholds associated with a user and a chord rank 520 associated with the user.

FIG. 6 depicts one embodiment of a character map 600 associated with the motion of interface device 110. The character map 600 may associate characters with the displacement and/or rotations of interface device 110. Responsive to determining the displacement and/or rotations of interface device 110, different characters, such as guided page movements, curser movements, clicks, and interfacing with files may be initiated.

FIG. 7-11 depicts one embodiment of input device 700. One skilled in the art will appreciate that input device 700 may be designed to be any desired shape, right or left-handedness and/or size, which may be based on comfort, utilization, and ergonomics.

Figure 7:
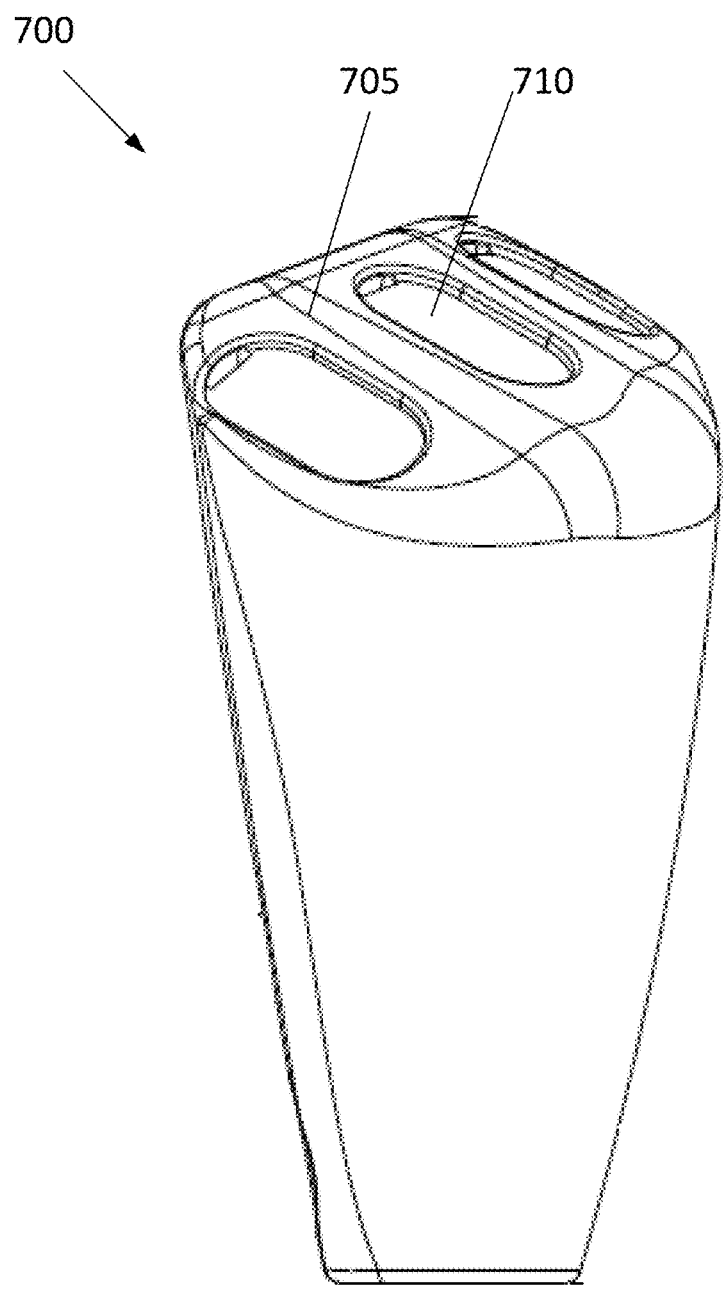
FIG. 7 depicts an input device, according to an embodiment.
Figure 8:
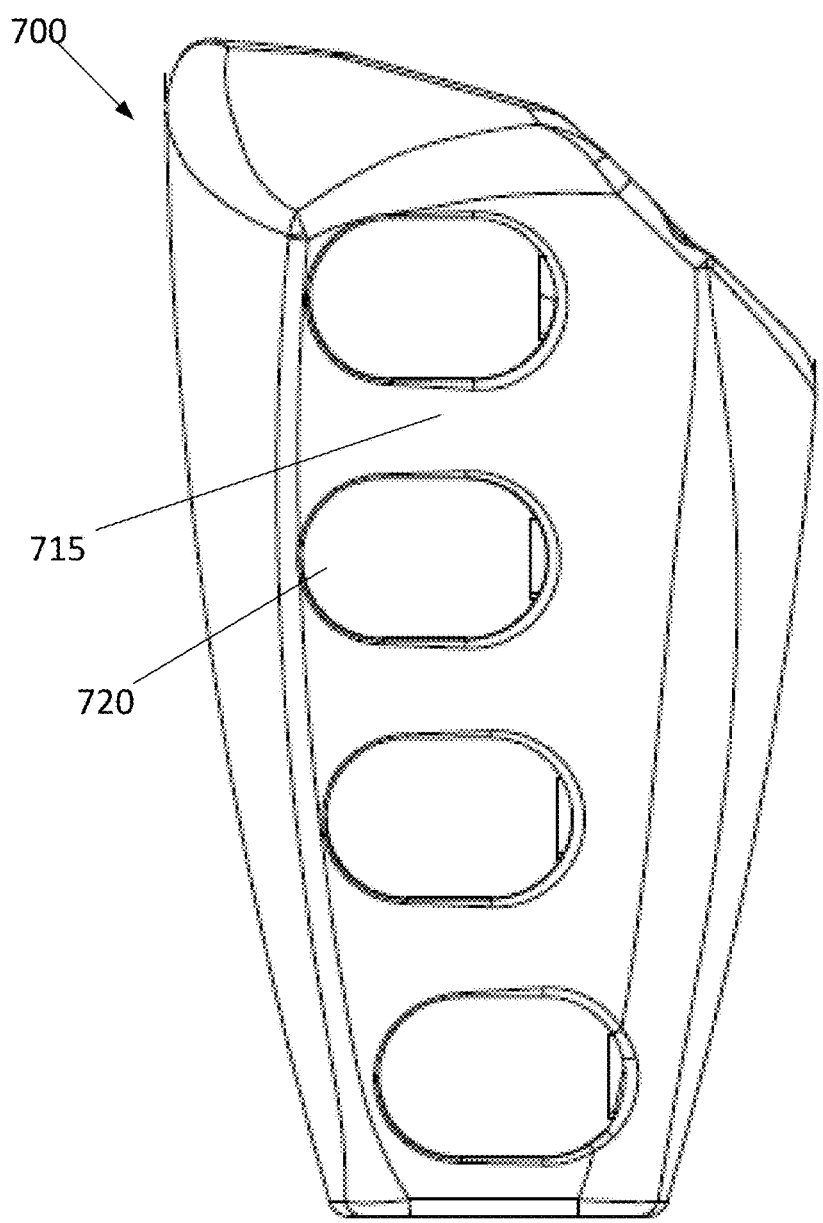
FIG. 8 depicts an input device, according to an embodiment.
Figure 9:
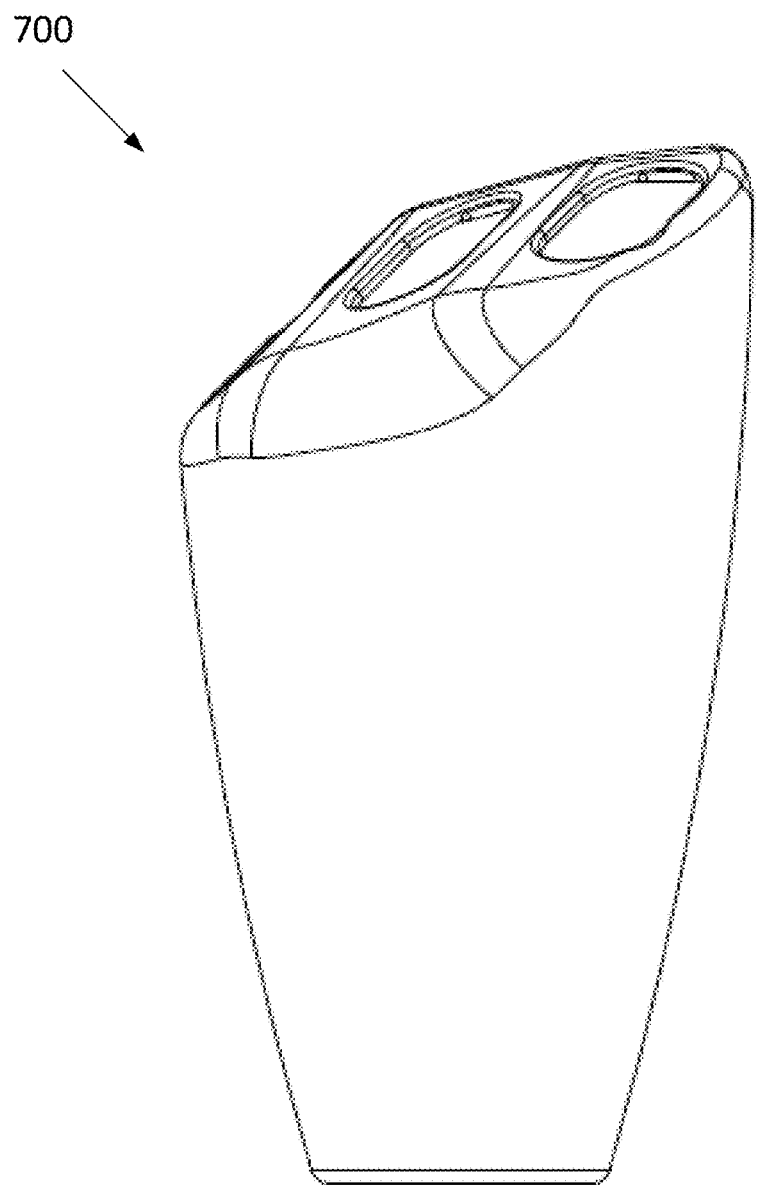
FIG. 9 depicts an input device, according to an embodiment.
Figure 10:
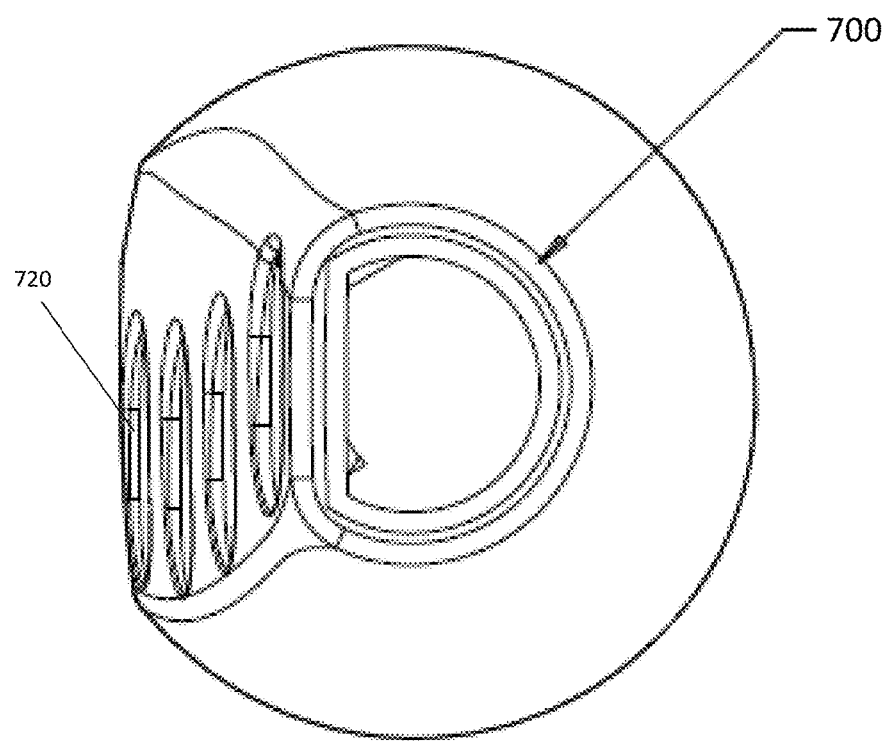
FIG. 10 depicts an input device, according to an embodiment.
Figure 11:
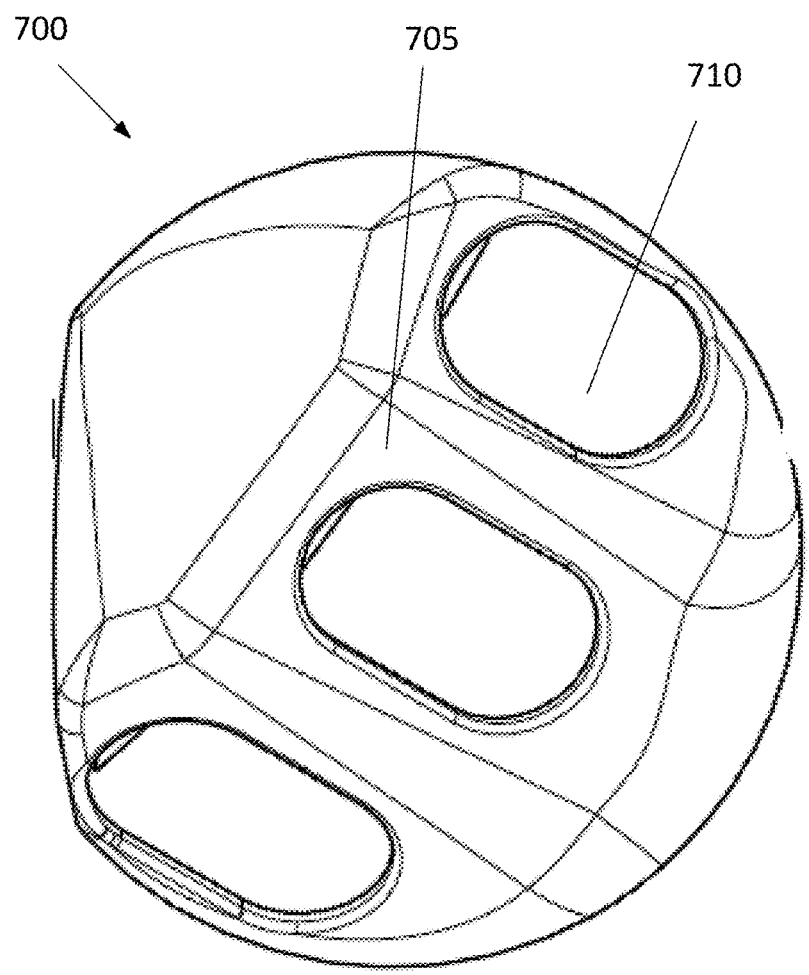
FIG. 11 depicts an input device, according to an embodiment.

As depicted in FIGS. 7-11, input device 700 may have a first set of pressure sensors 710 positioned on an upper surface 705 of input device. Each of the pressure sensors 710 may be configured to allow a user's thumb to input pressure data on a different pressure sensor 710 to form different characters. As depicted in FIG. 7, each of the pressure sensors 710 may be vertically and horizontal offset from each other to conform to a user's natural movement of their thumb.

As further depicted in FIG. 7-11, input device 700 may include a second set of pressure sensors 720 that are positioned on a side surface 715 of input device 700. Each of the pressure sensors 720 may be configured to receive pressure from a different digit on the user's hand. In embodiments, the side surface 715 of input device 700 may be tapered, wherein a lower end of side surface 715 has a smaller circumference that an upper end of side surface 715. Furthermore, each of the pressure sensors 720 may be horizontally and vertically offset from each other to align with different lengths of the user's digits.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

The flowcharts and block diagrams in the flow diagrams illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagrams.

What is claimed is:

1. A user interface device comprising:
    a plurality of pressure sensors positioned on an exterior surface of the user interface device, each of the plurality of sensors being configured to align with a digit of a hand, the plurality of pressure sensors being configured to determine pressure data corresponding to the pressure applied to a corresponding pressure sensor, the plurality of sensors including a plurality of thumb pressure sensors and a plurality of finger pressure sensors, the plurality of thumb pressure sensors being positioned on a contoured exterior surface of the user interface device such that the plurality of thumb pressure sensors are vertically and horizontally offset from each other, the plurality of digit pressure sensors being positioned on a contoured sidewall of the user interface device such that the plurality of digit pressure sensors are vertically and horizontally offset from each other along the contoured sidewall;
    a profile module configured to store mapping information and pressure information, the mapping information being configured to map pressure data with characters and the pressure information including pressure thresholds associated with each of the plurality of sensors, wherein the profile information includes speed information, the speed information being associated with a number of pressure sensor signals and corresponding characters input over a time range;
    an input module configured to determine input data based on the pressure data and the pressure thresholds associated with each of the plurality of pressure sensors, wherein the input data includes first input data and second input data;
    a mapping module configured to parse the mapping information to determine that the first input data corresponds with a first designated character;
    a single accelerometer associated with the user interface device configured to determine movement data of the user interface device corresponding with a first character or command, the movement data including information associated with displacement and acceleration of the user interface device;
    a coincidence module is configured to determine that the first input data corresponds with the first character and the second input data corresponds with a second character, the first input data having a first time threshold and the second input data having a second time threshold, wherein the first time threshold and the second time threshold are different periods of time, wherein the coincidence module is configured to determine that first input data corresponds with the first character and the second input data corresponds with the second character when actions to input the second character are performed outside of the first time threshold, wherein the input data associated with the designated character is a segmented binary chord, wherein each of the segments of the binary chord corresponds with a different pressure sensor.

2. The user interface device of claim 1, wherein first time threshold for different users is different.

3. The user interface device of claim 1, wherein each of the pressure thresholds corresponding to each of the pressure sensors is different.

4. The user interface device of claim 1, wherein the coincidence module configured to determine if pressure applied to the pressure sensors is the first character or a plurality of successive characters.

5. A method of utilizing a hand held user interface device, the method comprising:
    determining, via a plurality of pressure sensors on an exterior surface of the hand held user interface device, pressure data corresponding to pressure applied to a corresponding pressure sensor, the plurality of sensors including a plurality of thumb pressure sensors and a plurality of digit pressure sensors, the plurality of thumb pressure sensors being positioned on a contoured upper surface of the exterior surface of the user interface device such that the plurality of thumb pressure sensors are vertically and horizontally offset from each other, the plurality of digit pressure sensors being positioned on a contoured sidewall of the user interface device such that the plurality of digit pressure sensors are vertically and horizontally offset from each other along the contoured sidewall;
    mapping, via map information, pressure data with characters, wherein the mapping information includes speed information, the speed information being associated with a number of pressure sensor signals and corresponding characters input over a time range;
    storing pressure thresholds associated with each of the plurality of sensors;
    determine input data based on the pressure data and the pressure thresholds associated with each of the plurality of pressure sensors, wherein the input data includes first input data and second input data;
    determining, via a single accelerometer, movement data of the user interface device corresponding with a first character or command, the movement data including information associated with displacement and acceleration of the user interface device;
    parsing the mapping information to determine that the first input data corresponds with the first character and the second input data corresponds with a second character, the first input data having a first time threshold and the second input data having a second time threshold, wherein the first time threshold and the second time threshold are different periods of time, wherein the coincidence module is configured to determine that first input data corresponds with the first character and the second input data corresponds with the second character when actions to input the second character are performed outside of the first time threshold, wherein the input data associated with the first character is a segmented binary chord, wherein each of the segments of the binary chord corresponds with a different pressure sensor, wherein each of the pressure thresholds corresponding to each of the pressure sensors is different.

6. The method claim 5, wherein the first time threshold for different users is different.

\* \* \* \* \*